A. F. TURNER & F. M. DIGMAN.
TAP.
APPLICATION FILED MAY 2, 1908.
931,526.
Patented Aug. 17, 1909.
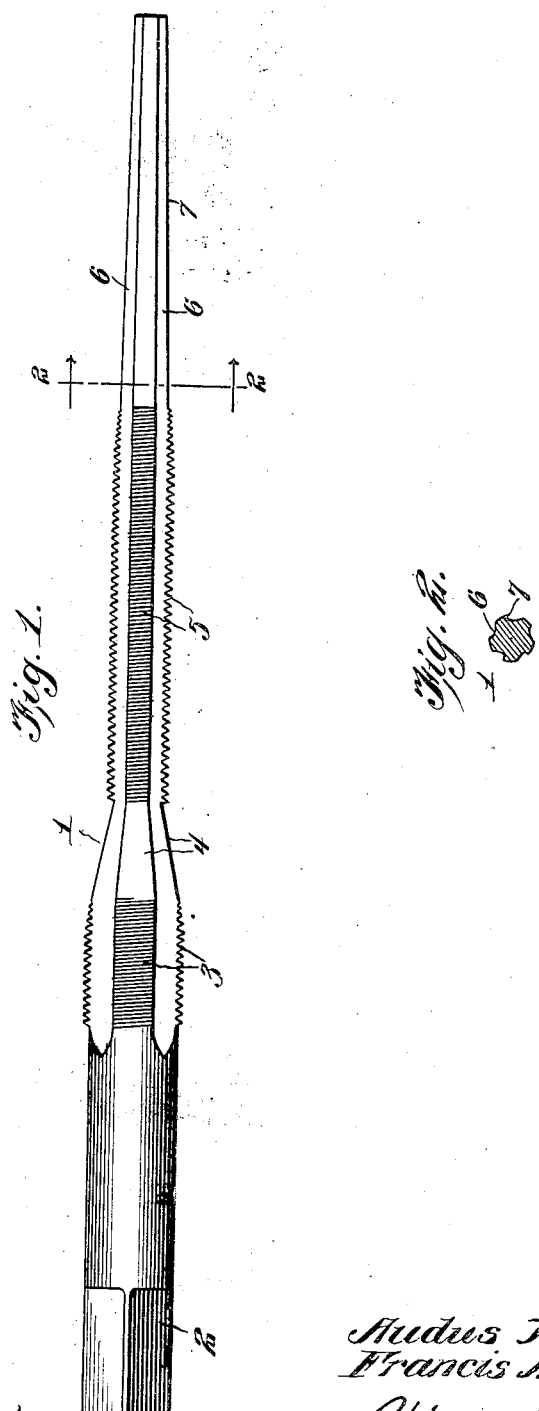
Witnesses
Inventors
Audus F. Turner
Francis M. Digman
By Victor J. Evans
Attorney

UNITED STATES PATENT OFFICE.

AUDUS F. TURNER AND FRANCIS M. DIGMAN, OF WITT, ILLINOIS.

TAP.

No. 931,526.     Specification of Letters Patent.     Patented Aug. 17, 1909.

Application filed May 2, 1908. Serial No. 430,565.

*To all whom it may concern:*

Be it known that we, AUDUS F. TURNER and FRANCIS M. DIGMAN, citizens of the United States, residing at Witt, in the county of Montgomery and State of Illinois, have invented new and useful Improvements in Taps, of which the following is a specification.

This invention relates to taps, and the object of the invention is to provide a device of this character primarily intended for cutting threads of different sizes in fire box boilers, at a single operation, whereby stay bolts having an enlarged threaded head portion and a reduced threaded body portion may be readily positioned between the plates of fire box boilers, and the necessity of employing different size taps requiring separate operations entirely obviated.

Another object of the invention is to provide a tap of this character having a small and a large screw cutting surface whereby the threaded openings are bored in direct alinement with each other, thereby assuring the accurate positioning of the stay bolt securing the plates of fire box boilers.

A still further object of the invention is to provide a tap for the purpose set forth, comprising a shank portion partly provided with threads, a reduced portion provided with threads, a tapering portion extending from the threads upon the reduced portion and an inclined portion between the threads, the tap being provided with longitudinal grooves extending across the teeth and through the entire length of the tap, and the grooves are provided with a cutting edge to provide reamers upon the shank of the tap.

With these and other objects in view the invention resides in the novel construction of taps hereinafter fully described and claimed.

In the accompanying drawings. Figure 1 is a side elevation of a tap constructed in accordance with the present invention. Fig. 2 is a transverse sectional view on the plane indicated by the dotted lines 2—2 of Fig. 1.

In the drawings the numeral 1 designates the improved tap. This tap 1 comprises an elongated member having one of its ends 2 squared or provided with shoulders whereby the tap may be secured for operation in a brace or stock. The tap 1 is provided with the enlarged thread cutting portions 3 and is thence inclined downwardly as at 4 and provided with the reduced thread cutting portion 5, and thence continued at a slight taper to the end of the device.

The tap is provided with radially disposed longitudinal extending grooves or clearing spaces 6, and these grooves have one of their edges sharpened as at 7 to provide a cutting face. The grooves 5 are adapted to extend across the teeth of the tap and through the entire longitudinal length thereof, so as to provide cutting surfaces whereby the smaller screw cutting teeth 5 may be readily engaged within the opening provided by the beveled reamer, and after passing from the first plate of the boiler fire box, may be readily engaged with the opposite plate, and the opening formed in the first plate will be readily enlarged by the teeth of the inclined portion and the thread cutting teeth 3 easily engaged in the opening formed within the first plate.

By reference to Fig. 1 of the drawings it will be noted that the cutting teeth 3 and 5 are reduced at their outer edges so as easily to enter the opening provided by the cutting portions of the device.

Having thus fully described the invention what is claimed as new is:

A tool comprising two taps of different diameters, and two reamers, one of which connects the taps and is relatively short and of comparatively sharp taper, and the other of which is relatively long and of gentle taper.

In testimony whereof we affix our signatures in presence of two witnesses.

AUDUS F. TURNER.
            FRANCIS M. DIGMAN.

Witnesses:
    A. A. BETTY,
    A. M. SCOTT.